United States Patent [19]
Glick

[11] Patent Number: 5,450,689
[45] Date of Patent: Sep. 19, 1995

[54] ELONGATED SINKER

[76] Inventor: Roy Glick, 17080 Boones Ct., NE., Woodburn, Oreg. 97071

[21] Appl. No.: 142,522

[22] Filed: Nov. 2, 1993

[51] Int. Cl.⁶ .............................................. A01K 95/00
[52] U.S. Cl. ................................... 43/44.97; 43/42.45
[58] Field of Search ............... 43/44.87, 44.88, 44.89, 43/44.96, 44.97, 42.45

[56] References Cited

U.S. PATENT DOCUMENTS

| | | | |
|---|---|---|---|
| 2,086,457 | 7/1937 | Zielesch | 43/44.97 |
| 2,577,549 | 12/1951 | Vice | 43/44.97 |
| 3,148,475 | 9/1964 | Goodall | 43/44.97 |
| 3,218,572 | 4/1964 | McVay | 43/42.45 |
| 3,648,398 | 3/1972 | Newell | 43/44.97 |
| 4,602,452 | 7/1986 | Reid | 43/42.45 |
| 4,649,662 | 3/1987 | Tharp | 43/44.97 |

*Primary Examiner*—Kurt Rowan
*Attorney, Agent, or Firm*—Klarquist, Sparkman, Campbell, Leigh & Whinston

[57] ABSTRACT

A sinker for use in trolling comprising an elogated piece of metal or other structural material having a bend and a twist with an angle above the forward portion of said sinker which imparts a side to side motion of the sinker which imparts a side to side motion to the lure and/or bait.

1 Claim, 1 Drawing Sheet

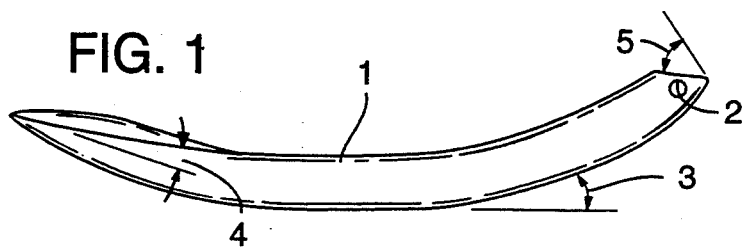
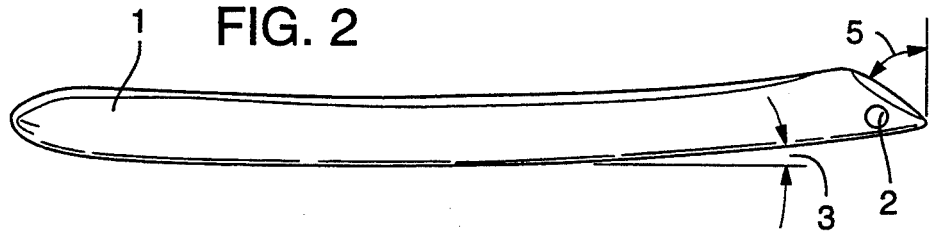
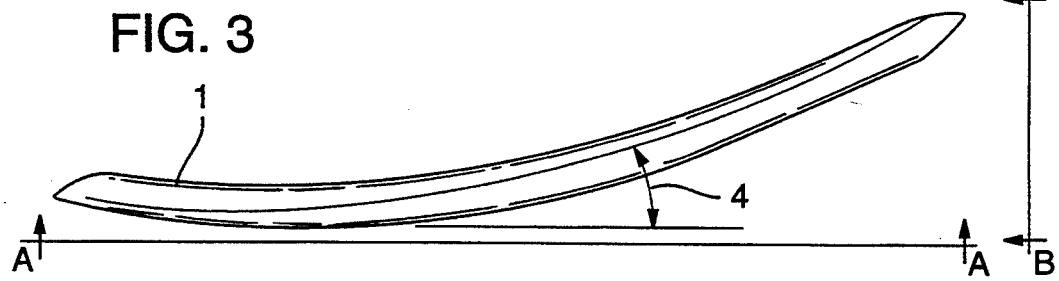
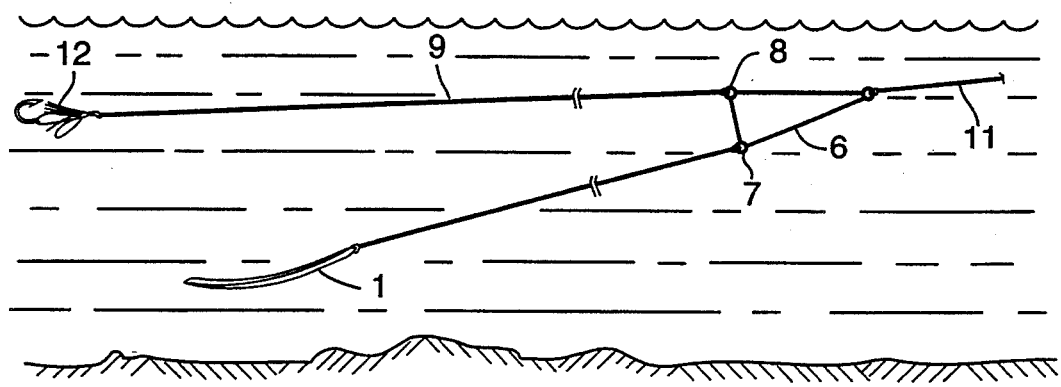
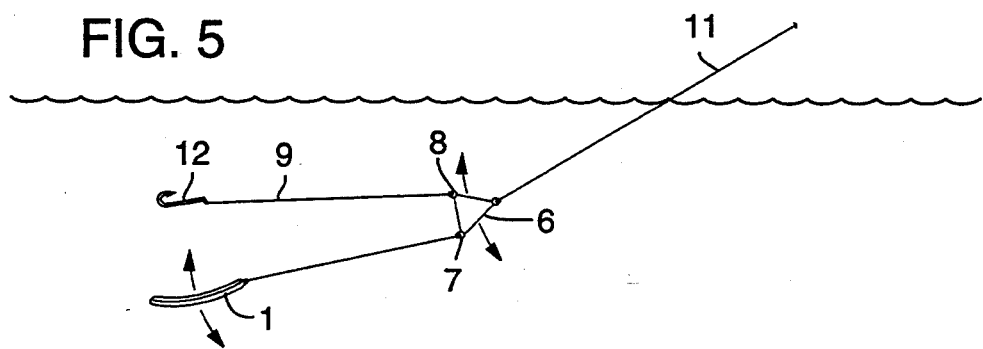

ELONGATED SINKER

BACKGROUND OF THE INVENTION

1. Field of Invention

This invention relates to sinkers used in trolling assemblies and, more particularly, to elogated sinkers used to impart motion to a trolling assembly.

2. Prior Art

Most sinkers are short and broad and, in ocean fishing, round. The purpose of the sinker is to hold the lure or bait at a predetermined depth based on the weight of the sinker and speed of trolling.

The sinker of U.S. Pat. No. 3,466,788 is an elongated sinker but is meant to float. The sinker of U.S. Pat. No. 3,589,052 fits around a bead chain on a fishing line by means of a cam and is elongated. A different form of sinker which uses a dynamic depressor or flat plate is disclosed in U.S. Pat No. 3,466,787. Lead shot is placed in the container 8 and may move fore and aft in container 8 depending whether the flat plate is rising or lowering.

The problems with the prior art is that the shorter, broader sinkers have more resistance or drag. They impart no motion to the bait and, in fact, tend to resist imparting any motion to lures or bait. Furthermore, sinkers tend to snag on underwater grass or branches. This invention overcomes the aforesaid problems.

SUMMARY OF THE INVENTION

An elongated piece of lead with a hole at the front portion is attached to a line from a spreader. The elongated piece of lead is bent a pretermined angle. The elongated piece of lead is twisted at a pretermined angle. The front portion has a pretermined angle. A side to side motion occurs in the elongated piece of lead as trolled.

It is an object of this invention to impart motion to lures or bait.

It is another object of the invention to avoid snagging underwater grass or branches.

It is another object of this invention to sink deeper for the same amount of weight.

BRIEF DESCRIPTION OF THE DRAWINGS

FIG. 1 is a perspective view of the invention.

FIG. 2 is a side view of the invention.

FIG. 3 is a top view of the invention.

FIG. 4 is a top view of spreader, line, bait or lure when trolled.

FIG. 5 is a top view of invention when trolled.

DETAILED DESCRIPTION OF THE INVENTION

The sinker 1 is shown in perspective view in FIG. 1. A bend angle 3 is indicated. A twist angle 4 is shown. The angle 5 is shown on the front portion of the sinker above the hole 2.

FIG. 2 shows most clearly the bend angle 3 and the angle 5 of the sinker 1.

FIG. 3 shows most clearly the twist angle 4 of the sinker 1. Bend angle 3 is seen as the sinker is viewed in a first plane denoted A—A in FIG. 3 and the twist angle 4 would be seen as viewed in a plane denoted B—B in FIG. 3 extending perpendicular to the first plane.

FIGS. 4 and 5 show the invention in operation. The pole line 11 (from a pole, not shown) is attached to a spreader 6 (a rudder or different types of spreaders can use). The spreader 6 has a bait swivel 8 from which bait line 9 ends attached to hook 12. The sinker swival 7 attaches the spreader 6 and sinker swivel 7. The assembly with bait or lure is lowered into the water. The boat where the fishing pole is located operates at low speed, i.e. trolls. The bend angle 3 causes the sinker 1 to move back and forth or side to side. This motion is carried to the spreader 6 so that the spreader moves side to side. The side to side motion of the spreader 6 is carried or transferred to the hook 12 giving a side to side motion. The twist angle 4 adds additional side to side motion. It is noted that the elongated sinker 1 has less resistance and will tend to go deeper than the same weight round sinker. Furthermore the elongated sinker with angle 5 is much less apt to snag on underwater grass or branches.

It is preferred that the bend angle 3 be 15 degrees, the twist angle 4 be 15 degrees, and the angle 4 be 45 degrees. The bend angle 3 can range from 1 degree to 80 degrees. The twist angle 4 can vary from 1 degree to 80 degrees. The angle 5 can range from 1 degree to 80 degrees.

Having thus described in detail a preferred embodiment of the present invention, it will be apparent to those skilled in the art that various physical changes may be made in the invention described without altering the inventive concepts and principles embodied. The present embodiment is therefore to be considered as illustrative and not restrictive, the scope of the invention being indicated by the appended claims.

I claim:

1. A sinker comprising:
   an elongated piece of material with a bend angle along the longitudinal axis between 1 degree and 80 degrees as viewed in a first plane;
   a twist angle around said longitudinal axis between 1 degree and 80 degrees as viewed in a plane perpendicular to said first plane;
   an angle of the front portion of said sinker between 1 degree and 80 degrees, and means for attaching said sinker to a line.

* * * * *

UNITED STATES PATENT AND TRADEMARK OFFICE
CERTIFICATE OF CORRECTION

PATENT NO.  : 5,450,689
DATED       : September 19, 1995
INVENTOR(S) : Roy Glick It is certified that error appears in the above-indentified patent and that said Letters Patent is hereby corrected as shown below:

On the title page, Column 2, "3,218,572" should read —3,128,572—.

Signed and Sealed this

Thirtieth Day of July, 1996

Attest:

BRUCE LEHMAN

*Attesting Officer*     *Commissioner of Patents and Trademarks*